United States Patent [19]

Takatori et al.

[11] Patent Number: 5,528,700
[45] Date of Patent: Jun. 18, 1996

[54] CHARACTER RECOGNITION SYSTEM BASED ON A NEURAL NETWORK

[75] Inventors: Sunao Takatori; Makoto Yamamoto, both of Tokyo, Japan

[73] Assignee: Yozan Inc., Tokyo, Japan

[21] Appl. No.: 232,415

[22] Filed: Apr. 25, 1994

Related U.S. Application Data

[60] Continuation of Ser. No. 31,140, Mar. 12, 1993, abandoned, which is a division of Ser. No. 680,117, Apr. 3, 1991, Pat. No. 5,257,342.

[30] Foreign Application Priority Data

Apr. 4, 1990 [JP] Japan ............................. 2-88163

[51] Int. Cl.⁶ ............................................. G06T 1/40
[52] U.S. Cl. ................................ 382/157; 395/23
[58] Field of Search ........................ 382/14, 15, 36, 382/16, 156, 157; 395/21, 23, 24

[56] References Cited

U.S. PATENT DOCUMENTS

| | | | |
|---|---|---|---|
| 4,092,631 | 5/1978 | Suzuki et al. | 382/24 |
| 4,874,963 | 10/1989 | Alspector | 395/23 |
| 5,033,066 | 7/1991 | DeVore | 377/39 |
| 5,048,097 | 9/1991 | Gaborski et al. | 382/14 |
| 5,048,100 | 9/1991 | Kuperstein | 382/36 |
| 5,052,043 | 9/1991 | Gaborski | 382/14 |
| 5,054,093 | 10/1991 | Cooper et al. | 382/14 |
| 5,060,278 | 10/1991 | Fukumizu | 382/14 |
| 5,067,164 | 11/1991 | Denker et al. | 382/15 |
| 5,151,951 | 9/1992 | Ueda et al. | 382/14 |
| 5,185,816 | 2/1993 | Takatori et al. | 382/15 |
| 5,249,259 | 9/1993 | Harvey | 395/23 |

OTHER PUBLICATIONS

Gonzalez, Digital Image Processing, Addison–Wesley 1992, pp. 597–599.

Primary Examiner—Michael T. Razavi
Assistant Examiner—Jon Chang
Attorney, Agent, or Firm—Cushman, Darby & Cushman

[57] ABSTRACT

A character recognition system based on a neural network determines activation patterns in an input layer and output layer, increases weights of synapses in a middle layer so that neurons activate with more than a certain rate among those corresponding to neurons in the input layer and the output layer and repeats the same process for each neuron in the middle layer. The input layer and output layer possess a plurality of neurons which activate and output certain data according to a specific result and the middle layer is between the input layer and output layer. The middle layer also possesses a plurality of neurons which are connected to each neuron in the input layer and output layer.

1 Claim, 3 Drawing Sheets

CHARACTER RECOGNITION SYSTEM BASED ON A NEURAL NETWORK

This is a continuation of application Ser. No. 08/031,140, filed on Mar. 12, 1993, which was abandoned upon the filing hereof: which was a Division of application Ser. No. 07/680, 117, filed Apr. 3, 1991, now U.S. Pat. No. 5,257,342.

BACKGROUND OF THE INVENTION

1. Field of the Invention

The present invention is related to a data processing system based on the concept of a neural network.

2. Background Information

A neural network in a data processing system is constructed in a layer state by arranging neural cells in parallel, see model 1 in FIG. 3 ("neuron" hereinafter) The neuron in each layer combines by synapses with all the neurons in adjacent layers and inputs and outputs data. Concerning neuron 1, in FIG. 3, weights W1, W2, W3, . . . , Wn are multiplied by data I1, I2, I3, . . . , In inputted from outside, and data 0 is outputted corresponding to the comparison between the sum of the multiplication and threshold θ.

Various methods are possible for the comparison. When normalized function 1[f] is adopted, output data 0 is expressed as formula (1).

$$0=1 \ [\Sigma Wn \cdot In - \theta]$$

When ρWn·In is more than or equal to threshold θ, the neuron activates, and output data 0 is "1"; when ΣWn·In is less than threshold θ, the neuron is not activated, and output data 0 is "0".

Conventional neural networks have neural layers with neurons arranged in parallel with the neural layers connected in series. Neural layers are comprised of, for example, 3 layers, namely, an input layer, a middle layer and an output layer, as Perceptrons suggested by Rosenblatt. The neuron in each layer combines with all neurons in adjacent other layers by synapses.

SUMMARY OF THE INVENTION

In such a data processing system, the operation to adapt the weight of synapse of each neuron is called "learning". However, problems exist, such as guaranteeing its realization and performing it efficiently. For example, in the back-propagation method, there are problems, such as getting out of local minimum and convergence time. This tendency is quite prevalent in neural networks including a lot of middle layers.

The present invention solves the above-mentioned problems of the prior art and has an object to provide a learning method with the ability to execute efficient learning to the middle layer.

A learning method of the present invention works as illustrated below:

i) deciding activation patterns in an input layer and in an output layer arbitrarily concerning plural inputs and outputs;

ii) deciding that weights of synapses in a middle layer and output layer have the tendency of activation in a case that neurons activate with more than a certain rate among those in the middle layer corresponding to neurons in the input layer and the output layer and neurons adjacent to them in the middle layer.

In the case where there are a lot of middle layers, the middle layer is increased sequentially by adding a new middle layer when the learning in a middle layer is concluded on a certain step and executing the same learning to it. Here, the number of neurons in the input and the output layer is decided by data capacity of neurons in the whole neural network. Therefore, it is necessary to increase middle layers to process a lot of data.

PREFERRED EMBODIMENTS OF THE PRESENT INVENTION

Hereinafter, the present invention is explained with reference to the attached drawings.

Figure 1:
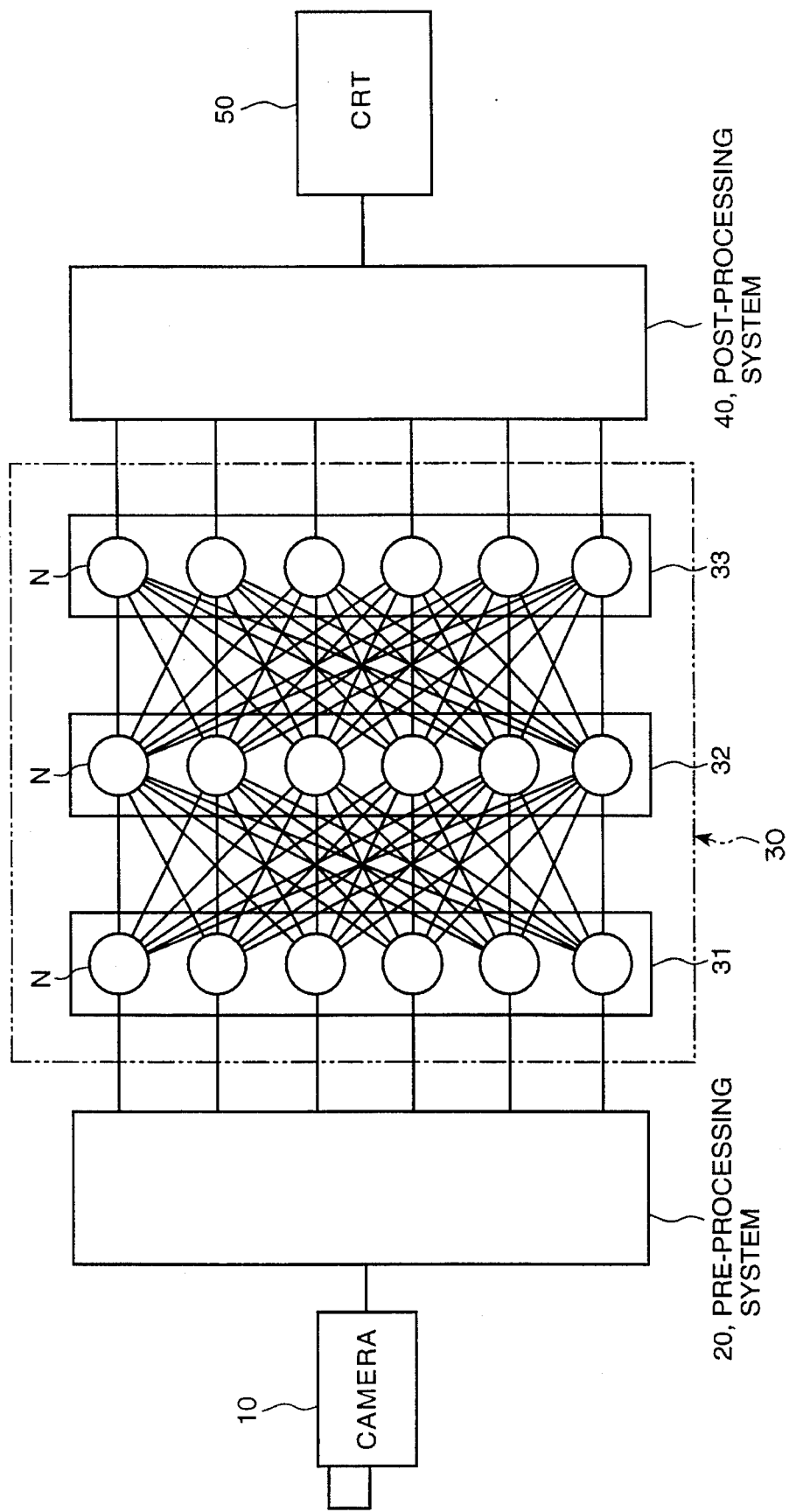
FIG. 1 shows an approximate structure of a character recognition system applied to the first embodiment of the present invention.

FIG. 1 shows a character recognition system comprising a data processing system according to the first embodiment. The character recognition system comprises video camera 10, preprocessing system 20, data processing system 30, post-processing system 40 and display 50. Video camera 10 is situated in order to input characters/letters and is connected to preprocessing system 20. Preprocessing system 20 is, for example, a well-known image processing system, which extracts the characteristics of an inputted character/letter (the number of edge points or branch points, for instance) and outputs the data to data processing system 30. Data processing system 30, having a neural network construction which will be described later, recognizes a character/letter based on the characteristics data inputted from preprocessing system 20, and outputs the data according to the recognition result to post-processing system 40. The recognition signal is character codes, for instance. Post-processing system 40 stores the output data as, for example, word processor data and simultaneously outputs to display 50. Display 50 is a CRT and indicates the characters/letters recognized by data processing system 40 on the display.

The neural network of data processing system 30 is constructed as a part of the hardware of a computer. Data processing system 30 is expressed in FIG. 1 as a model. It comprises input layer 31, middle layer 32, and output layer 33. Middle layer 32 is arranged between input layer 31 and output layer 33. In the present embodiment, each layer 31, 32, and 33 comprises the same number of neurons N. Each neuron in input layer 31 is connected to each neuron N in middle layer 32, and those neurons in middle layer 32 are each connected to each neuron N in output layer 33.

Figure 3:
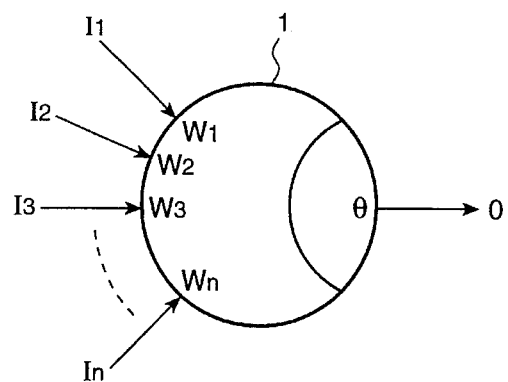
FIG. 3 shows an outline structure of an embodiment of a neuron.

As mentioned above, referring to FIG. 3, each neuron N outputs the data of "1" or "0" according to the normalized function in formula (1). Neuron N is constructed of an operator amplifier, for example. Weight Wn to be multiplied to the data to be inputted to each neuron N is obtained by a changeable resister connected to the input terminal. A threshold function is realized by a switching element. That is, learning is executed by changing output data and by changing weight Wn by changing the changeable resister according to output data of each neuron.

Figure 2:
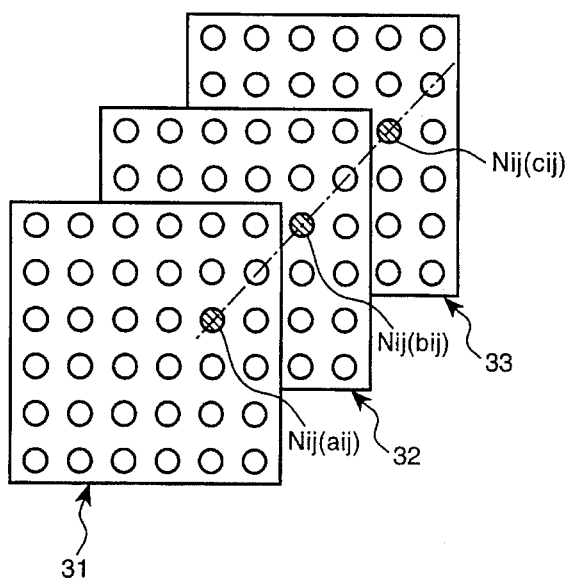
FIG. 2 shows an outline structure of neurons in an input layer, middle layer and output layer.

FIG. 2 shows input layer 31, middle layer 32 and output layer 33 as a model; each layer 31, 32 and 33 comprises the same number of neurons. Here, for a simple explanation, the number of neurons is 36 in each layer 31, 32 and 33. Neurons are arranged as 6 in the lateral direction and 6 in the longitudinal direction in each layer. It is presumed that the point in the left lower corner is the origin, and that the neuron in the location of i-th left and j-th upper is Nij.

Each neuron in input layer 31 is activated by characteristics data obtained through video camera 10. When an activation combination of N11, N12, N21 and N22 expresses the number of edge points, and N13, N14, N23 and N24 expresses the number of branch points, the activation pattern of neurons in input layer 31 is decided artificially according to characters/letters to be inputted.

On the other hand, in output layer 33, a character/letter is expressed by neuron Nii on a diagonal line from the edge on the lower left to the edge of the upper right. That is, the neurons on the diagonal line express the character code of the character/letter, and the activation pattern of neurons in output layer 33 is decided artificially. In the present embodiment, the kind of activation pattern is 64 for neuron Nii on the diagonal line. Therefore, it is possible to recognize 64 kinds of characters/letters; recognition of alphabets is possible, for example.

Before executing learning of character/letter recognition, neurons in output layer 33 do not activate even if character/letter data is inputted to data processing system 30. These neurons can be activated by learning. Its learning is concluded when a certain activation pattern appears according to inputted character/letter data. Input and output patterns for learning are the representative data to be processed in the neural network. The data to be actually processed exists widely. Learning is executed until association for the representative input and output data is performed adequately. When learning is concluded, input layer 31 and output layer 33 show ignition patterns decided arbitrarily according to inputted character/letter data as mentioned above. It is presumed that the activation pattern in each layer of input layer 31, middle layer 32 and output layer 33 changes smoothly in these layers of 31, 32 and 33. In the present embodiment, the weights in middle layer 32 and output layer 33 are changed in order for patterns in these layers to change smoothly in the learning process.

First, it is decided if neuron Nij in middle layer 32 activates or not considering the activation of neurons adjacent to each neuron Nij in input layer 31 and output layer 33 corresponding to the neuron Nij. That is, when neurons activate with more than a certain rate among corresponding neuron Nij and neurons around it in input layer 31 and output layer 33, neuron Nij in middle layer 32 is judged to have the tendency of ignition. Weights of designated neurons in middle layer 32 and output layer 33 are increased in order to obtain such activation.

Figure 5A:
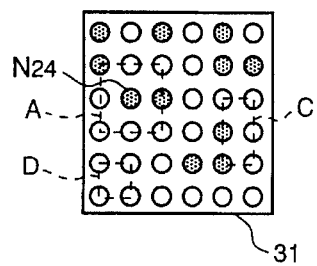
FIG. 5 (a), 5(b) and 5(c) show activation patterns of each layer when neurons in a middle layer have the tendency of activation in the case that the activation rate of neurons in a corresponding area is more than 15%.
Figure 5B:
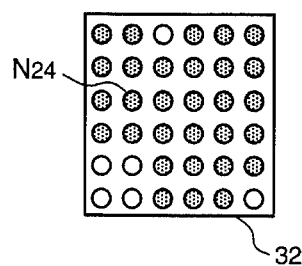
Figure 5C:
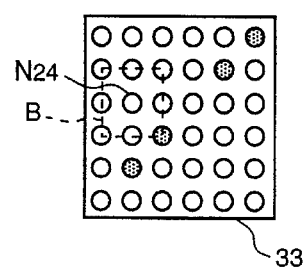

The judging method if neurons in the middle layer are to activate or not is described referring to FIG. 5 (a), (b) and (c). FIG. 5 (a) shows the activation pattern in input layer 31, FIG. 5 (b) shows that in middle layer 32, FIG. 5 (c) shows that in output layer 33. In these figures, black circles show activated neurons, white circles show non-activated neurons. In this embodiment, input layer 31 shows the activation pattern as in the diagram according to characteristics data of an inputted character/letter. The ignition activation pattern in output layer 33 has to be what is shown in the diagram so as to recognize it. That is, the activation pattern in input layer 31 in the diagram is fixed according to input character/letter. The ignition activation pattern in output layer 33 is what is determined on the completion of learning. The activation pattern in middle layer 32 is the one expected by the method of the present embodiment.

In FIG. 5 (a), 5(b) and 5(c), first the activation condition of, for instance, neuron N24 and 8 neurons adjacent to it in input layer 31 is examined, corresponding to neuron N24 in middle layer 32. That is, examining the activation condition of neurons in the area surrounded by broken line A, 3 neurons activate in it. In the same way, examining the activation distribution of neuron N24 in output layer 33 corresponding to N24 in middle layer 32 and neurons adjacent to it, that is, in the area surrounded by broken line B, 1 neuron activates. Therefore, 4 neurons activate among 18 neurons in input layer 31 and output layer 33 corresponding to neuron N24 in middle layer 32 and adjacent neurons to it. Neuron N24 in middle layer 32 is judged to have the tendency of activation when it is decided that the neuron in middle layer 32 is to activate in such a case of more than or equal to 15% of neurons activating among the neurons in areas A and B. As for FIG. 5 (a), 5(b) and 5(c), it is decided that a neuron in middle layer 32 has the tendency of activation when more than or equal to 15% of neurons are activated among the neurons in input layer 31 and output layer 33 corresponding to the neuron in middle layer 32.

Concerning the neurons on the edge, the activation condition of 6 neurons shown with broken line C is examined. Concerning the neurons on the corner, that of 4 neurons shown with broken line D is examined.

In FIG. 5 (a), 5(b) and 5(c), 30 black neurons are judged to have the tendency of activation among the neurons in middle layer 32. On the character/letter recognition learning, only certain values are increased in order for the weight of each neuron in middle layer 32 and output layer 33 to obtain the activation pattern obtained in this way.

Figure 4:
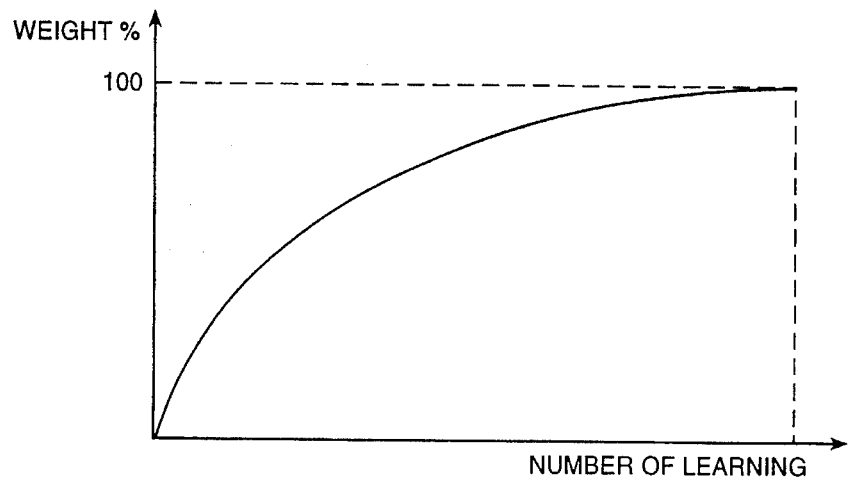
FIG. 4 shows a diagram of the relationship between the number of learning and weight.

Explaining the increase of weight using FIG. 4, when output data 0 of neuron 1 in the middle layer is the same value on activation (for instance "1"), the weight of synapse ("W2" and "W3" in this case) corresponding to the data inputted from an activated neuron (for instance "I2" and "I3") is, for example, increased 5% among the neurons in the input layer connected to neuron 1. The synapse weight of a neuron in the output layer is processed in the same way. As described above, the weight of synapse corresponding to the neuron in the middle layer decided to be activated is increased 5%, for example.

The weight of middle layer 32 and output layer 33 is increased in order for an activation pattern to be changed smoothly among each layer of input layer 31, middle layer 32 and output layer 33. Here it is decided that each neuron in input layer 31 and output layer 33 is to activate on the same frequency as much as possible for all input characters/letters. It is, therefore, possible for each neuron in middle layer 32 to ignite evenly. It is also possible to prevent the convergence at a local minimum, by neuron in middle layer 32 activating in even approximation. It is, therefore, possible to avoid the generation of neurons with no activation and to operate neurons in middle layer 32 efficiently.

The increase of synapse weight on one learning changes as in FIG. 4 according to the number of learnings. The learning of a whole system is executed gradually by many learnings, and simultaneously, fine adjustment is carried out for fine changes. The learning speed is developed by rapid increase of weight in the beginning.

In the embodiment above, middle layer 32 is connected to input layer 31 and output layer 33, that is, there are three layers. However, the present invention does not set limits on embodiments as 3 layers of neural networks. It is possible to apply it to neural networks with 4 or more layers. In this case, selecting the first middle layer before everything, the weight of synapse in the first middle layer and output layer is increased in order that each neuron in the middle layer has the tendency of activation when the neurons in the input layer and output layer corresponding to each other and neurons adjacent to them activate with more than a certain rate. When learning is concluded so far as a certain step concerning all the input characters/letters, adding the new second middle layer, the weight of synapse is increased in the second middle layer and the layer connected to the output side of it (output layer or the first middle layer), considering whether or not corresponding neurons and ones adjacent to it activate with more than a certain rate, in the same way as the second middle layer. Consequently, weight distribution in the case with 4 layers can be obtained. As to the case with 5 or more layers, the same process is performed.

Figure 6A:
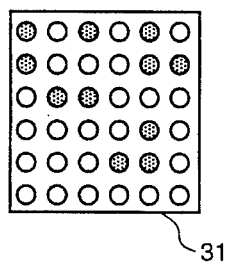
FIG. 6 (a), 6(b) and 6(c) show activation patterns of each layer when neurons in a middle layer have the tendency of activation in the case that the activation rate of neurons in a corresponding area is more than 20%.
Figure 6B:
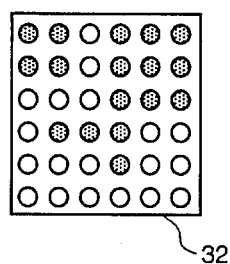
Figure 6C:
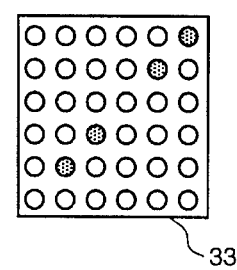

FIGS. 6 (a), 6(b) and 6(c) show activation patterns in layers 31, 32 and 33 on recognizing the same character/letter as in FIGS. 5 (a)–5(c). FIGS. 6 (a) and 6(c) are quite the same as FIGS. 5 (a) and 5(c). The activation pattern in middle layer 32 is decided to have the tendency of activation when the neurons corresponding to those in input layer 31, output layer 33 and adjacent to them activate more than 20%, different from FIG. 5 (b).

Figure 7A:
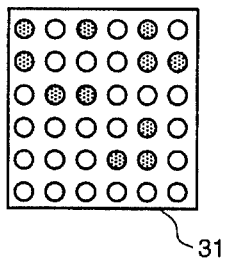
FIG. 7 (a), 7(b) and 7(c) show activation patterns of each layer when neurons in a middle layer have the tendency of activation in the case that the activation rate of neurons in a corresponding area is more than 25%.
Figure 7B:
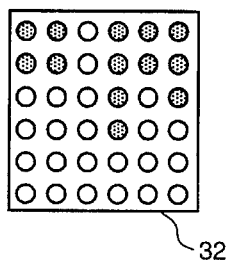
Figure 7C:
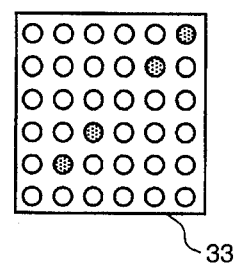

FIGS. 7 (a), 7(b) and 7(c) also show activation patterns in each layer on recognizing the same character/letter as in FIGS. 5 (a) to 6(c). FIGS. 6 (a)–5(c) are quite the same as FIGS. 5 (a) and 5(c). In FIGS. 7 (a) to 7(c), the activation pattern in middle layer 32 is decided to have the tendency of activation when neurons corresponding to those in input layer 31, output layer 33 and adjacent to them activate more than 25%.

As is easily understood from the comparison with FIG. 5 (b), FIG. 6 (b) and FIG. 7 (b), the activation pattern in middle layer 32 has the characteristic of activation pattern in both the input layer and output layer. The higher the activation rate of neurons in the area corresponding to input layer 31 and output layer 33, the less the number of neurons to be activated in middle layer 32.

Figure 8A:
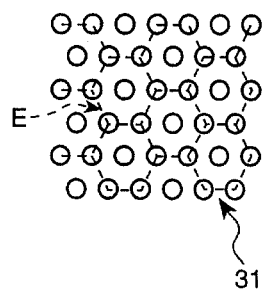
FIG. 8 (a), 8(b) and 8(c) show the neurons in an input layer, middle layer and output layer in the case that the arrangement of neurons can be divided into a honeycomb state.
Figure 8B:
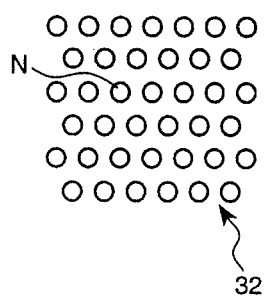
Figure 8C:
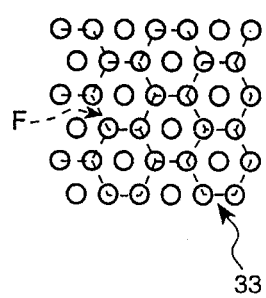

Though the areas A, B, C and D to decide neurons adjacent to each neuron are rectangles in the embodiments above, the form of an area is not limited. When the arrangement of neurons can be divided in the state of honeycomb, the form of the area is a hexagon as shown in FIGS. 8 (a), 8(b) and 8(c). In this case, area E in input layer 31 and area F in output layer corresponding to neuron N in middle layer 32 are comprised of 7 neurons. Neuron N in middle layer 32 has the tendency of activation when 14 neurons in area E and F activate with more than a certain rate.

The input and output data for a neuron is not limited to a binary value. It may be a multi-value and analog data when the data is digital. An output layer may be constructed to define a character/letter for recognition by all neurons. It is not necessary to be constructed to express character codes by neurons on a diagonal line. The number of neurons in the layers of 31, 32 and 33 is not set a limit of 36. It is possible to set it according to the number of kinds of characters/letters to be recognized.

The present invention can be applied to not only character/letter recognition but also pattern recognition and voice recognition. As mentioned above, it is possible to execute effective learning on the middle layer of a neural network by the present invention.

What is claimed is:

1. A character recognition system comprising:

input means for receiving input characters;

preprocessing means for extracting characteristics data from said input characters;

a neural network connected to said preprocessing means to recognize said input characters from said characteristics data generated by said preprocessing means and output a recognition signal wherein said neural network comprises an input layer, a middle layer and an output layer, each said layer including a plurality of neurons, each said neuron being a signal processing element, said middle layer being arranged between said input and output layers wherein each neuron in said middle layer is connected to each neuron in said input and output layers, said data processing means comprising:

first determining means for determining an activation pattern of said neurons in said input layer, second determining means for determining an activation pattern of said neurons in said output layer, for each neuron in said middle layer, neighborhood means for setting a neighborhood of neurons in said input and output layers corresponding to a neuron in said middle layer, for each neuron in said middle layer, third determining means for determining a rate of activation in said neighborhood of neurons, said rate being the total number of neurons activating in said neighborhood in said input and output layers divided by the total number of neurons in said neighborhood in said input and output layers, for each neuron in said middle layer, comparison means for comparing said rate to a threshold value, for each neuron in said middle layer, fourth determining means for determining that said neuron in said middle layer has a tendency to activate when said rate is greater than said threshold value, and for each neuron in said middle layer, increasing means for increasing the value of weights applied to all neurons in said input layer which are connected to said neuron in said middle layer and weights applied to all neurons in said output layer which are connected to said neuron in said middle layer, in order to increase the likelihood of activation of said neuron in said middle layer and thereby generate an activation pattern in said middle layer corresponding to said recognition signal, wherein said increasing is determined by the tendency to activate of said neuron in said middle layer; and post-processing means for storing said recognition signal; and display means for receiving said recognition signal from said post-processing means and displaying said recognition signal.

* * * * *